United States Patent [19]

Mims

[11] Patent Number: 4,818,420

[45] Date of Patent: Apr. 4, 1989

[54] BACKWASH FILTER

[75] Inventor: Ken Mims, Lake Monroe, Fla.

[73] Assignee: Uddo Mims International, Inc., Edgewater, Fla.

[21] Appl. No.: 49,840

[22] Filed: May 15, 1987

[51] Int. Cl.⁴ .................. B01D 23/24; B01D 29/38; B01D 35/30

[52] U.S. Cl. .................. 210/798; 210/108; 210/261; 210/262; 210/313; 210/323.2; 210/333.01; 210/411; 210/534

[58] Field of Search .............. 210/798, 803, 104, 108, 210/111, 112, 126, 138, 174, 261, 262, 312, 313, 323.2, 333.01, 334, 408, 411, 435, 438, 532.2, 534

[56] References Cited

U.S. PATENT DOCUMENTS

| | | | |
|---|---|---|---|
| 545,030 | 8/1895 | Wiselogel | 210/411 |
| 3,402,818 | 9/1968 | Sasaki | 210/333.01 |
| 3,627,131 | 12/1971 | Goodman | 210/108 |
| 3,637,079 | 1/1972 | Strub | 210/333.01 |
| 3,817,378 | 6/1974 | Ross | 210/108 |
| 3,820,658 | 6/1974 | Cruze, Jr. | 210/104 |
| 3,864,255 | 2/1975 | Swanson | 210/798 |
| 4,282,105 | 8/1981 | Crowe | 210/798 |
| 4,405,466 | 9/1983 | Giannelli et al. | 210/798 |

Primary Examiner—Benoît Castel
Assistant Examiner—Richard D. Jordan
Attorney, Agent, or Firm—Frijouf, Rust & Pyle

[57] ABSTRACT

A liquid filtering and backwashing apparatus comprising a filter tank having a first outlet valve and a filter cell disposed within the filter tank is disclosed. The filter cell includes a conduit and an outer member with the outer member spaced apart relative the conduit with a filtering medium positioned between the conduit and the outer member. A plurality of openings in the outer member enable fluid communication between the liquid to be filtered in the filter tank and the filtering medium. The conduit is provided with a plurality of slits to enable fluid communication between the filtering medium and interior of the conduit while retaining the filtering medium external the conduit. A backwash holding tank in fluid communication with the conduit collects the filtered liquid. The backwash holding tank includes a second outlet valve for the filtered liquid to drain. When the filter cell becomes clogged with the filter clogging material the first outlet valve is opened, the second outlet valve is closed, and the backwash holding tank is provided with compressed gas through an inlet valve forcing filtered liquid back into the filter cell and filter tank thereby backwashing the filter cell and filter tank.

20 Claims, 4 Drawing Sheets

BACKWASH FILTER

BACKGROUND OF THE INVENTION

1. Field of the Invention

This invention relates generally to a filter and backwashing apparatus. More specifically, a granular filter and a backwashing apparatus and method using filtered liquid under pressure is disclosed.

2. Description of the Prior Art

Granular filters are very effective in removing solid material from a liquid flow. However, the filter looses usefulness as it becomes impaired by the deposition and entrapment of filter clogging material. The success of any granular filter depends on the ease and on the extent which the filter can be cleaned.

The prior art utilizes numerous structures and flow patterns in order to enhance the ease and extent a clogged filter can be made useful. In an early process an outer portion of a rotatable cylinder comprising an inner and outer wire mesh cylinder which holds a filtering material between the wire mesh cylinders enables the influent to flow into the interior of the rotatable drum through the filtering medium and into a reservoir as cleaned water. As the filtering medium begins to clog, the level of influent water within the drum rises to trigger a motor which rotates the drum filtering means. Effluent cleaned water is then pumped from the effluent reservoir and sprayed upon the filtering means to wash it free of the clogging material. The contaminated backwash water is directed to an outflow by means of a trough with the cylinder. As the influent level falls the rotatable cylinder stops rotating thereby ending the backwash process.

In another prior art process for cleaning a sand filter, the water to be clarified passes upward through a sand filter and accumulates above the sand filter as clarified water which is allowed to drain off. For cleaning the sand filter, the process was essentially reversed.

In another process, a specially designed gravity filter apparatus prevents the filtering material from passing along with the effluent during the backwashing process. The backwashing process utilizes a washing liquid generally a water and gas mixture and passes this mixture upward through the filter to create a water-gas emulsion which loosens the clogging material from the filter.

In another gravity sand filter, the backwashing process utilizes a backwash fluid comprising water or water with air which is pushed up through the filter and removed from the filtering apparatus by overhead troughs.

The prior art systems are complex in structure, difficult to use and allow a portion of the filter clogging material to fall back onto the filter surface after the backwashing process.

It is a primary object of this invention to provide a filter and backwash apparatus and method which permits the filtered liquid to be used directly for backwashing the filter cell and filter tank.

It is a further object of this invention to provide a filter and backwash apparatus which is simple in design and economical to operate.

It is a further object of this invention to provide a filter and backwash apparatus which utilizes relatively a small amount of filtered water in the backwashing process.

It is a further object of this invention to provide a filter and backwash apparatus which is simple to operate.

It is a further object of this invention to provide a filter and backwash system which cleans the filtering medium and filter tank during the backwash process.

It is a further object of this invention to provide a filter and backwash process capable of manual or automatic backwash initiation and termination.

It is a further object of this invention to provide a filter cell which enables radial filtration and radial backwashing about the length of the filter cell.

It is a further object of this invention to provide a backwashing apparatus which prevents the clogging material removed from the filter cell and filter tank by backwashing to settle back onto the filter cell or back into the filter tank.

The foregoing has outlined some of the more pertinent objects of the present invention. These objects should be construed to be merely illustrative of some of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The liquid filter and backwash apparatus of the present invention is defined by the appended claims with specific embodiments shown in the attached drawngs. For the purpose of summarizing the invention, the invention relates to a liquid filtering and backwashing apparatus and to a method of liquid filtering and backwashing to remove suspended particles such as silt, mud, sand and the like from a liquid such as water. The liquid filtering and backwashing apparatus includes a filter tank, having a first and second end, to receive the liquid to be filtered from a means for admitting the liquid to be filtered into the filter tank. A filter cell, having a first and second end, is disposed within the filter tank. A conduit with a first end, a mid-point, and a second end is disclosed. An inner passageway extends from the first end of the conduit through the second end of the conduit. The section of the conduit which extends between the first end and the midpoint defines a first portion of the conduit. Whereas, a section of the conduit which extends from the mid-point of the conduit to the second end of the conduit defines a second portion. The first portion of the conduit is provided with a plurality of openings to enable fluid communication the inner passageway of the conduit and the filtering medium while retaining the filtering medium external the conduit. The filter cell includes the first portion of the conduit and an outer member. The outer member is spaced apart relative the first portion of the conduit. The outer member includes a first end and a second end. A filtering medium is positioned between the first portion of the conduit and the outer member of the filter cell to entrap filter clogging material from the liquid to be filtered thereby forming a filtered liquid. The conduit provides the inner passageway to enable fluid conveyance or communication therethrough. The first end of the filter cell includes the first end of the outer member and the first end of the conduit. The second end of the filter cell includes the second end of the outer member. The first and second ends of the filter cell are sealed in order to contain the filtering medium between the conduit and the outer member of the filter cell and to seal the liquid to be filtered from the inner passageway of the conduit by a route other than passing through the outer member and filtering medium of the filter cell. A plurality of openings in the outer member enable fluid communication with the filtering medium. The outer member is positioned around and spaced from the conduit to retain the filtering medium internal the outer member. A backwash holding tank in fluid communication with the second portion of the conduit and collects the filtered liquid flowing from the conduit. The first end of the filter tank includes a first outlet valve positioned to enable outward flow from the filter tank. The backwash holding tank includes a second outlet valve to enable the filtered liquid to drain from the holding tank. The backwash holding tank includes an inlet valve to admit compressed gas into the holding tank after opening the first outlet valve of the filter tank and closing the second outlet valve of the holding tank to enable backwashing of the filter cell and filter tank utilizing the filtered liquid collected in the backwash holding tank.

In a preferred embodiment the openings in the conduit are long narrow openings or slits.

In another embodiment of the invention the filter tank includes a V-shaped bottom to aid in drainage and removal of the filter clogging material from the filter tank. The filter tank includes a first end and a second end with the first end of the V-shaped bottom being lower relative the second end of the V-shaped bottom resulting in a sloping downward configuration whereby liquid flow along the bottom of the filter tank is enhanced. The first outlet of the filter tank is positioned proximate the first end of the V-shaped bottom to enhance outward flow from the filter tank during the backwashing process. In a preferred embodiment of the invention the filter cell is positioned parallel to the sloped V-shaped bottom of the filter tank with the first end of the filter cell being positioned proximate the first outlet valve of the filter tank to further enhance the outward flow from the filter tank during the backwashing process. This position also enables the filtered water to be decanted, to an extent, when it flows out of the conduit and into the holding tank. That is, any sediment or the like which may enter the conduit tends to collect at the lower first end of the conduit with the filtered liquid draining off from the upper second end of the conduit and into the backwash holding tank.

The conduit provides a passageway through which fluid is conveyed. The first portion of the conduit is provided with a plurality of openings, preferably a plurality of slits, about the surface of the pipe. These openings provides a fluid passage between the filter medium and the first portion of the conduit by either the filtered liquid or the cleansing liquid.

The outer member is provided with a plurality of openings of a sufficient size to permit the retention of the filtering medium internal the outer member while allowing fluid communication therethrough. Preferably, the outer member comprises either a wire mesh, such as a screen, or a perforated sleeve. Preferably, the openings in outer member are about 0.01 inches.

In another embodiment of the invention the filtering medium is granular. The preferred granular size of the granular filtering medium has a diameter of about 0.02 to 0.03 inches with the openings formed in the outer member of the filter cell having a diameter of about 0.01 inches and with the plurality of slits provided in the first portion of the conduit of the filter cell being long cuts having a width of about 0.01 inches. The most preferred granular filtering medium is sand.

The preferred shape of the conduit and outer member is cylindrical.

In a preferred embodiment the filter and backwash apparatus further includes a float switch control means positioned in the filter tank to activate the backwash process. The float switch is activated when a second level in the filter tank is reached by the liquid to be filtered. This indicates that the filtering medium is clogged thereby impeding the flow of the liquid to be filtered through the filter cell resulting in the liquid to be filtered rising to the second level. At this level the first outlet valve of the filter tank is opened, the second outlet valve of the holding tank is closed and the inlet valve is opened to admit compressed gas into the holding tank to initiate the backwash process. In the most preferred embodiment a timing means activated by the float switch control means closes the first outlet valve and the inlet valve and opens the second outlet valve after a preset period of time terminates the backwash process thereby enabling the filtering process to restart.

In another embodiment the liquid to be filtered is treated effluent from a sewage treatment plant. In this application the first outlet valve is in fluid communication with a mud well or reservoir which is in further fluid communication with the sewage treatment facility. This enables the flow from the first outlet valve, which comprises filter clogging material and other particles or sediment from the bottom of the filter tank which are suspended or mixed with the cleansing water or liquid during the backwash process, hereafter referred to as "spent backwash liquid", together with a limited amount (from the filter tank) of liquid to be filtered, to be removed or discharged from the filter tank to enter the mud well and be pumped back to the sewage treatment plant for further treatment.

In a preferred embodiment of the invention a filter tank for receiving the liquid to be filtered includes a first end and a second end. The first end of the filter tank includes a first outlet valve to enable in use an outward flow from the filter tank. The filter tank includes a V-shaped bottom to further enhance in use the outward flow from the first outlet valve of the filter tank. The V-shaped bottom further includes a first end and a second end with the first end of the V-shaped bottom being lower relative the second end of the V-shaped bottom to augment outward flow from the filter tank. The first outlet of the filter tank is positioned proximate the first end of the V-shaped bottom. A filter cell for filtering the liquid to be filtered includes a first end and a second end and is disposed within the filter tank in a parallel manner relative to the V-shaped bottom. A conduit with a first end, a mid-point, and a second end is disclosed. The section of the conduit which extends between the first end and the midpoint defines a first portion of the conduit. Whereas, a section of the conduit which extends from the mid-point of the conduit to the second end of the conduit defines a second portion. The first portion of the conduit is provided with a plurality of openings to enable fluid communication with the inner passageway of the conduit and the filtering medium while retaining the filtering medium external the conduit. The filer cell includes an outer member and the first portion of the conduit. The outer member includes a first end and a second end. The filter cell includes a first end and a second end, with the first end of the filter cell including the first end of the outer member and the first end of the conduit, with the second end of the filter cell including the second end of the outer member. the outer member of the filter cell is spaced apart relative to the first portion of the conduit. A filtering medium positioned between the first portion of the conduit and the outer member entraps filter clogging material from the liquid to be filtered thereby forming a filtered liquid. The first and second ends of the filter cell are sealed such that the filtering medium is contained between the first portion of the conduit and the outer member. The first portion of the conduit is provided with a plurality of openings to enable fluid communication with the inner passageway of the conduit while retaining the filtering medium external the first portion of the conduit. A plurality of openings formed in the outer member to enable fluid communication with the filtering medium. A backwash holding tank collects the filtered liquid. The second portion of the conduit extending into the backwash holding tank provides fluid communication between the backwash holding tank and the first portion of the conduit. A mud well is positioned below the filter tank to receive the outward flow from the first outlet valve of the filter tank of spent backwash liquid. The backwash holding tank includes a second outlet valve to enable the filtered liquid to drain from the holding tank. The backwash holding tank includes an inlet valve to admit compressed gas into the holding tank after the second outlet valve of the holding tank is closed and the first outlet valve of the filter tank is opened to enable backwashing of the filter cell and filter tank.

In another embodiment a method of filtering and backwashing comprises providing a liquid filtering and backwashing apparatus including a a filter tank with a first outlet valve. A conduit which includes a first portion and a second portion is disclosed. A filter cell which includes the first portion of the conduit and an outer member with the outer member being positioned around and spaced apart from the first portion of the conduit. A filtering medium is positioned between the first portion of the conduit and the outer member. The first portion of the conduit is provided with a plurality of openings to permit fluid communication therethrough, the outer member retains the filtering medium proximate the first portion of the conduit and has a plurality of openings formed therein to enable fluid communication therethrough. The first portion of the conduit of the filter cell and the outer member of the filter cell are disposed within the filter tank. The second portion of the conduit is in fluid communication with a backwash holding tank having a second outlet valve and an inlet valve. A filter and backwash operation is conducted by introducing a liquid to be filtered into the filter tank until the liquid to be filtered reaches a first level which enables the liquid to be filtered to cover the filter cell thereby enabling the liquid to be filtered to flow radially inward through the plurality of openings of the outer member and into the filtering medium which entraps the filter clogging material thereby forming a filtered liquid. During the filtering process the filtered liquid passes through the plurality of openings formed in the first portion of the conduit and is conveyed by the second portion of the conduit into the backwash holding tank whereby the filtered liquid is collected to the first level. When the filtered liquid reaches the first level, the filtered liquid drains from the backwash holding tank through a second outlet valve positioned at the first level. Periodically the filtering operation is terminated when the liquid to be filtered in the filter tank reaches a second level in the filter tank. The second level indicates that the filtering medium is clogged and therefore impeding the flow of the liquid to be filtered through the filter cell resulting in the liquid to rise from the first level to the second level. Upon reaching the second level a backwash operation is conducted by opening the first outlet valve of the filter tank, closing the second outlet valve of the backwash holding tank and opening the inlet valve to a compressed gas source. The compressed gas forces the filtered liquid collected in the backwash holding tank as a cleansing liquid into the conduit, through the openings of the conduit, through the filtering medium and through the plurality of openings of the outer member whereby the material clogging the filtering medium is loosened and forced radially outward from the filter cell and into the filter tank. The cleansing liquid and clogging material from the filter tank is discharged through the first outlet valve thereby backwashing the filter cell and the filter tank. The filtering process is restarted by closing the first outlet valve of the filter tank and the gas inlet valve of the backwash holding tank and by opening the second outlet valve of the backwash holding tank.

Preferably the method includes a float switch control means positioned in the filter tank to automatically close the second outlet valve of the holding tank, to open the first outlet valve of the filter tank and to open the inlet valve of the holding tank to admit compressed gas into the holding tank when the second level is reached in the filter tank to initiate the backwashing process. Most preferably the float switch control means includes a timing means activated by thd float switch control means to close the first outlet valve and the inlet valve and to open the second outlet valve after a preset period of time to restart the filtering process.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structure for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
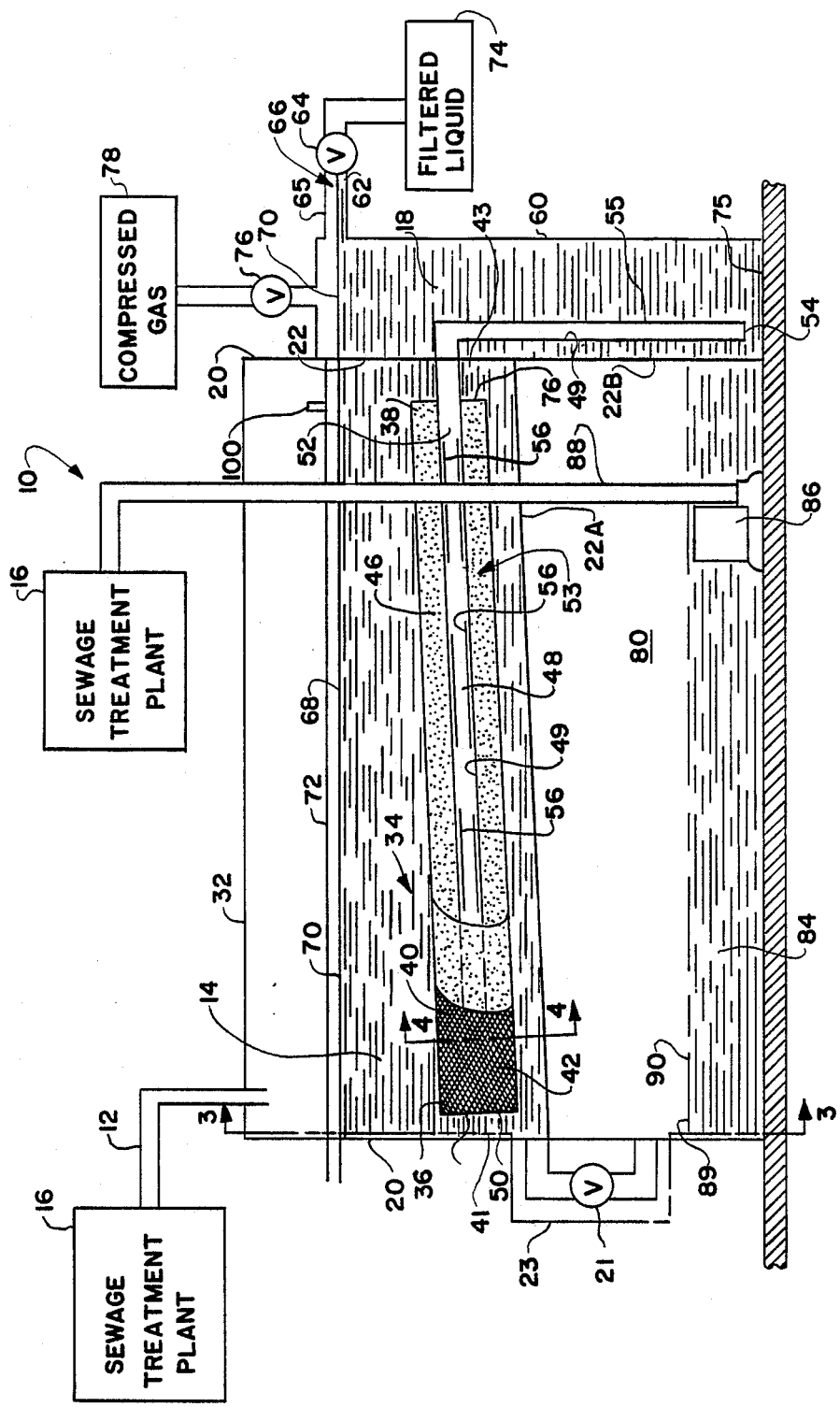
FIG. 1 is a cross-sectional view of the backwashing filter apparatus.

FIG. 1 illustrates a cross-sectional view of a liquid filter and backwashing apparatus 10 according to one embodiment of this invention. The liquid filtering and backwashing apparatus 10 comprises a filter tank 20 for receiving the raw fluid which is to be filtered 14, hereinafter to referred to as "liquid to be filtered," from a sewage treatment plant 16 by conduit 12. The liquid filter and backwashing apparatus 10 further includes a backwash holding tank 60 for collecting the filtered liquid 18 and a mud well 80 for holding liquid to be returned to the sewage treatment plant 16. In one embodiment the filter tank 20 is separated from the backwash holding tank 60 by a wall 22 whereas the filter tank 20 is separated from the mud well 80 by a wall 22A. The backwash holding tank 60 is separated from the mud well 80 by a wall 22B.

The apparatus 10 includes a filter cell 34 having a first end 36 and a second end 38 positioned within the filter tank 20. The filter cell 34 includes an outer member 40 having a plurality of openings 42 formed therein. The plurality of openings 42 enable fluid communication with a filtering medium 46 located within the filter cell 34. The filter cell 34 also includes a conduit 48 having a first end 50 a mid-point 52 and a second end 54 with a plurality of slits 56 formed in the conduit 48 between the first end 50 and the mid-point 52 thereof. The first end 50 of the conduit 48 is positioned proximate the first end 36 of the filter cell 34 whereas the mid-point 52 of the conduit 48 is positioned proximate the secnd end 38 of the filter cell 34. The portion of the conduit 48 which extends between the first end 50 of the conduit 48 and the midpoint 52 of the conduit 48 defines a first portion 53 of the conduit 48. Whereas, a second portion 55 of the conduit 48 is located in the backwash holding tank 60 and extends from the midpoint 52 of the conduit 48 to the second end 54 of the conduit 48. Midpoint 52 is that point along conduit 48 positioned somewhere between the first end 50 and the secnd end 54 of conduit 48 and is not necessarily at a point mid-way between the ends 50,54 of conduit 48. The liquid in the backwash holding tank 60 of the apparatus 10 is referred to as the filtered liquid 18. The outer member 40 of filter cell 34 is partially cut away to illustrate the filtering medium 46 and the first portion 53 of the conduit 48 with a plurality of slits 56 formed in the first portion 53 of the conduit 48.

The backwash holding tank 60 collects the filtered liquid 18 from the second end 54 of the conduit 48. A second outlet valve 64 positioned in the backwash holding tank 60 determines the maximum liquid height 66 in the backwash holding tank 60 since valve 64 preferably provides the only drain from the apparatus 10 during the filtering process. Preferably, the maximum liquid height 66 in the backwash holding tank 60 is the same level as the liquid height 68 in the filter tank 20 with both levels being equal and defining a first level 70. The second outlet valve 64 of the backwash holding tank 60 controls and enables the collected filtered liquid 62 in excess of the first level 70 to drain from the backwash holding tank 60 and into a filtered liquid reservoir 74. The backwash holding tank 60 further inclues an inlet valve 76 connected to a source of compressed gas 78. The backwash holding tank 60 of the apparatus 10 is preferably a sealed tank as shown.

The filter tank 20 of apparatus 10 further includes a first outlet valve 21 providing fluid communication from the filter tank 20 to the mud well 80. The mud well 80 holds the liquid obtained as a result of the backwashing process referred to as spent backwash liquid 84. A return 86 pumps the spent backwash liquid 84 through a conduit 88 to the sewage treatment plant 16 to maintain a level 89 of the spent backwash liquid 84 in the mud well 80 below a third level 90.

The liquid to be filtered 14 is introduced into the filter tank 20 such that the first level 70 is reached. The position of the first level 70 is determined by the position of the second outlet valve 64 of the backwash holding tank 60. At the first level 70, the filter cell 34 is covered by the liquid to be filtered 14. The liquid to be filtered 14 flows through the plurality of openings 42 formed in outer member 40 of the filter cell and into the filtering medium 46 where solid impurities are removed by the action of the filtering medium 46 to result in a filtered liquid 18. The filtered liquid 18 flows from the filtering medium 46 through a plurality of long narrow slits 56 formed in the first portion 53 conduit 48 into the interior passageway 49 of the conduit 48. The filtered liquid 18 then flows from the first portion 53 of the conduit 48 to the second portion 55 of the conduit 48 and into the backwash holding tank 60. The filtered liquid 18 flows into the backwash holding tank ultimately reaching the second outlet valve 64 where the filtered liquid 18 flows into the filtered liquid reservoir 74. Preferably, when the liquid 18 flows out outlet valve 64 the first level 70 is reached in the filter tank 20 and the backwash holding tank 60. The first level 70 is maintained by inputting a quantity of liquid to be filtered 14 via conduit 12 and outputting a similar quantity of filtered liquid 18 via valve 64.

When the level of the liquid to be filtered 14 in the filter tank 20 reaches a second level 72, this indicates that the filer cell 34 is becoming clogged thus slowing the filtering movement of the liquid to be filtered 14 through the filter cell 34. With reference to the liquid level in the filter tank 20, the operating level or first level 70 is below the backwash or second level 72. In order to remove the filter clogging material a backwashing process is initiated. First outlet valve 21 of the filter tank 20 is opened to allow the liquid to be filtered 14 to flow into the mud well 80 thereby emptying the filter tank 20. The second outlet valve 64 of the backwash holding tank 60 is closed. The inlet valve 76 of the backwash holding tank 60 opens to admit compressed gas 78 into the holding tank 60 to force the filtered liquid 18 (now characterized as a cleansing liquid 19) back into conduit 48 of filter cell 34, then back into and out of the filter cell 34, into the filter tank 20 and through the open first outlet valve 21 and into the mud well 80. The cleansing liquid 19 is characterized as spent backwash liquid 84 as it exits the filter tank 20 via the first outlet valve 21 of filter tank 20. The mud well 80 acts as a reservoir for the spent backwash liquid 84. The spent backwash liquid 84 is returned to the sewage treatment plant 16 by means of a mud well 80 return pump 76 for retreatment.

Figure 2:
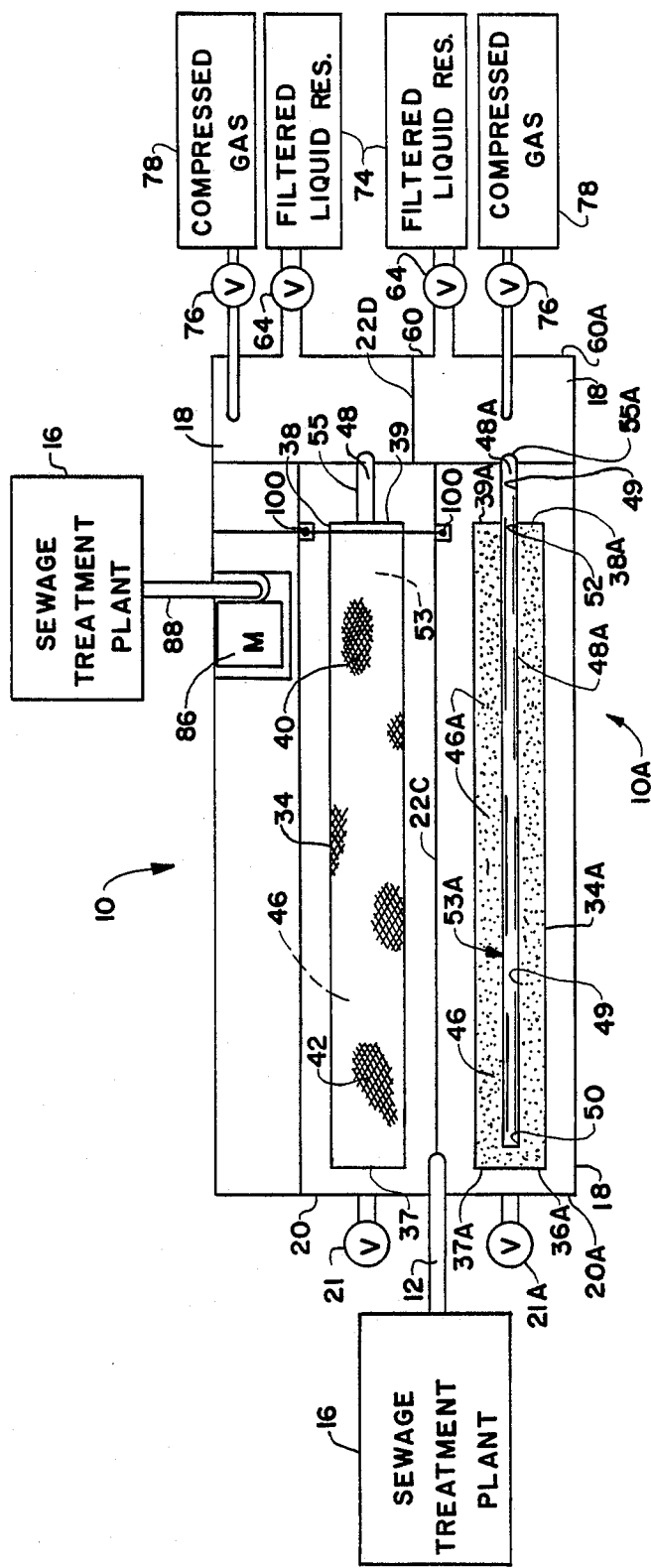
FIG. 2 is a top view of a backwashing filter apparatus shown in FIG. 1.

FIG. 2 is a cross-sectional top view of separate backwashing filter apparatus 10, 10A illustrating two filter cells 34,34A within their respective filter tanks 20,20A. A description of one of the backwashing filter apparatus 10 described the other apparatus 10A. Each filter cell 34,34A has similar features. Filter cell 34A is positioned in the filter tank 20A with the first end 36A proximate the first outlet valve 21A. The first portion 53A of conduit 48A is surrounded by the filtering medium 46A with the outer member 40 of the filter cell enveloping the filtering medium 46. Filter cell 34A further illustrates the filter cell with both the outer member 40 and a portion of the filtering medium 46 removed in order to display the first portion 53A of conduit 48A. The outer member 40 of the filter cell 34 is positioned around and extends slightly more than the length of the first portion 53 of the conduit 48. Filter cell 34 is sealed 37,39 at its first end 36 and its second end 38, respectively, in order to contain the filtering medium 46 between the first portion 53 of the conduit 48 and the outer member 40 of the filter cell. In a like manner, the first 36A and second 38A ends of the filter cell 34A are sealed 37A, 39A, respectively. The seal 37, 39 at the first end 36 and second end 38 of the filter cell 34 comprises material such as the screening of outer member 40. The second portion 55,55A of each conduit 48,48A exits each filter cell 34, 34A in order to provide fluid communication with their respective backwash holding tank 60, 60A.

The backwash holding tank 60 is in fluid communication with the second end 54 of conduit 48 of the filter cell 34. The volume of the backwash holding tank 60 is generally an amount sufficient to fill the volume of the inner passageway 49 of conduit 48 during the backwash process. The height of the second outlet valve 64 in the backwash holding tank 60 determines the first level 70 of the filtered liquid 18 in the backwash holding tank 60 and filter tank 20. The filtered liquid 18 collects in the backwash holding tank 60 until the first level 70 is reached at which level the filtered liquid 18 begins to flow out of the second outlet valve 64 and into the filtered liquid reservoir 74. When the liquid to be filtered 14 in the filter tank 20 is at the first level 70 the filter cell 34 is covered by the liquid to be filtered 14.

The liquid to be filtered 14 is introduced through conduit 12 into the filter tank 20. The liquid to be filtered 14 enters the filter cell 34 through the plurality of openings 42 formed in the outer member 40 of the filter cell 34. The liquid to be filtered 14 then passes through the filter medium 46 wherein solid impurities are removed by the action of the filtering medium 46. The now filtered liquid 18 then enters the conduit 48 of the filter cell 34 through a plurality of slits 46 formed in the first portion 53 of the conduit 48 as filtered liquid 18. The filtered liquid 18 drains from the second end 54 of the conduit 48 into the backwash holding tank 60 of the apparatus 10. So long as the liquid to be filtered 14 passes through the filter medium 46 and the second outlet valve 64 of the backwash holding tank is open, the level of the liquid to be filtered 14 in the filter tank 20 remains at a substantially constant first level 70 in the filter tank 20 and in the backwash holding tank 60 of the apparatus 10.

An inlet valve 76 is positioned in the backwash holding tank 60 and provides an inlet for compressed gas 78. The compressed gas 78 forces the filtered liquid 18 in the backwash holding tank 60 to flow back into the second end 54 of the conduit 48, through the plurality of slits 46 formed in the first portion 53 of the conduit 48, radially outward through the filtering medium 46 and radially outward through the plurality of openings 42 in the outer member 40 of the filter cell 34 and into the filter tank 20 to flow out the first valve 21 and into mud well 80. The second portion 55 of conduit 48 of backwash holding tank 60 is preferably positioned proximate the bottom of backwash tank 60 and does not have formed in its surface a plurality of slits such as the slits formed in the first portion 53 of conduit 48. This enhances the cleansing operation by making use of essentially all of the liquid 18 in the backwash tank 60.

Figure 3:
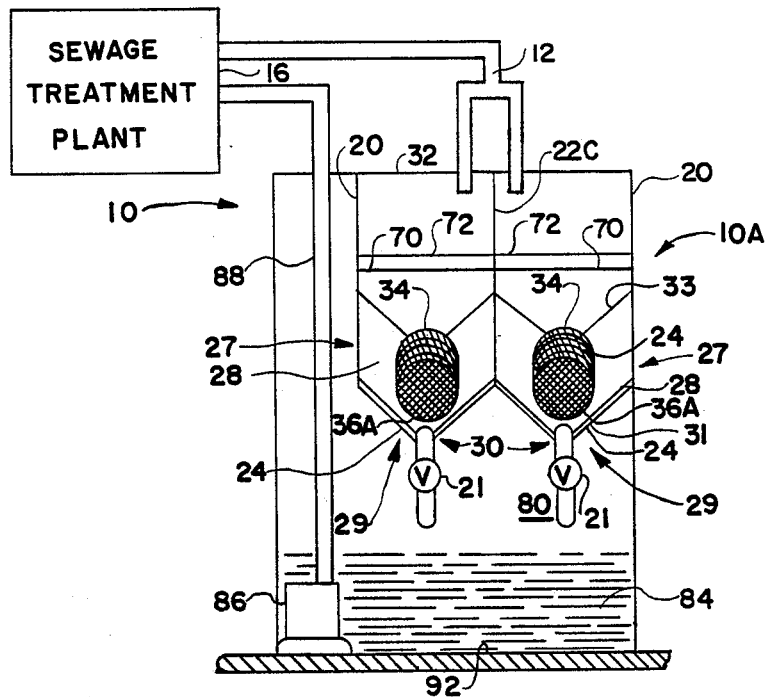
FIG. 3 is a partial front view of the backwashing filter apparatus taken along line 3—3 of FIG. 1.

FIG. 3 is a back view of the backwashing filter apparatus 10, 10A with their respective filter tanks and backwash holding tanks separated by a common wall wall 22C, 22D respectively illustrating the V-shaped bottom 29 of filter tank 20 with first outlet valve 21 interconnecting the filter tank 20 and mud well 80. A return pump 86 is positioned on the floor 92 of the mud well 80. A conduit 88 is connected to pump 86 to return the spent backwash liquid 84 to the sewage treatment plant 16.

A conduit 12 or other means for admitting the liquid to be filtered into the filter tank, such as a trough, is positioned to enable flow into the filter tank 20. The filter tank 20 may be open at the top 32 to permit access by the conduit 12 to the filter tank from any top position.

Preferably, the filter tank 20 preferably is sloped downward 27 toward the first end 24 such that the outward flow of the cleansing liquid 19 is directed towards the first outlet valve 21. Preferably, the bottom of the filter tank 20 is V-shaped 29 in order to further enhance the outward flow of the cleansing liquid 19 from the filter tank 20. Most preferably, the bottom of filter tank 20 is V-shaped 29 and sloped 27 such that the first end 31 of the V-shaped bottom 29 is lower relative the second end 33 of the V-shaped bottom 29. Preferably, opening the first outlet valve 21 is aligned with the apex 30 of the V-shaped bottom 29 in order to enable an unobstructed outward flow of the cleansing liquid 19 out of the filter tank 20 and into mud well 80. The backwash flow discharges directly into mud well 80 which is preferably positioned below filter tank 20 in order to enhance the cleansing action by the backwashing liquid 19 upon the bottom 28 of the filter tank 20.

Figure 4:
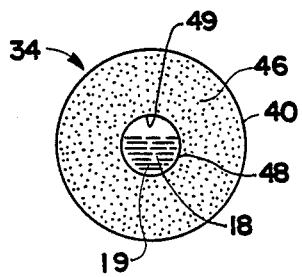
FIG. 4 is a partial sectional view of the filter cell taken along line 4—4 of FIG. 1.

FIG. 4 illustrates a sectional view of the filter cell 34 illustrated at FIG. 1. Outer member 40 is spaced from the conduit 48 with the filtering medium 46 positioned between the conduit 48 and outer member 40, that is, in the volume between the outer member 40 and first portion 53 of conduit 48 of the filter cell 34. Preferably, the outer member 40 of the filter cell 34 is a screen with about 0.01 inch holes, the first portion 53 of the conduit 48 is a P.V.C. pipe having a plurality of slits or long narrow cuts or openings 56 with a width of about 0.01 inches therein. Preferably, the filtering medium 46 is sand with an average size diameter of 0.02 to 0.03 inches. This size relationship enables the outer member 40 and first portion 53 of the conduit 48 to contain the filtering medium 46 within the filter cell 34 during both the filtering process and backwashing process. The second portion 55 of the conduit 48 extends into the backwash holding tank 60 to provide fluid communication therewith. During the filtering process the filtered liquid 18 travels within the passageway 49 of conduit 48. Whereas, during the backwash process, filtered liquid, characterized as cleansing liquid 19, is forced within the passageway 49 of conduit 48.

Figure 5:
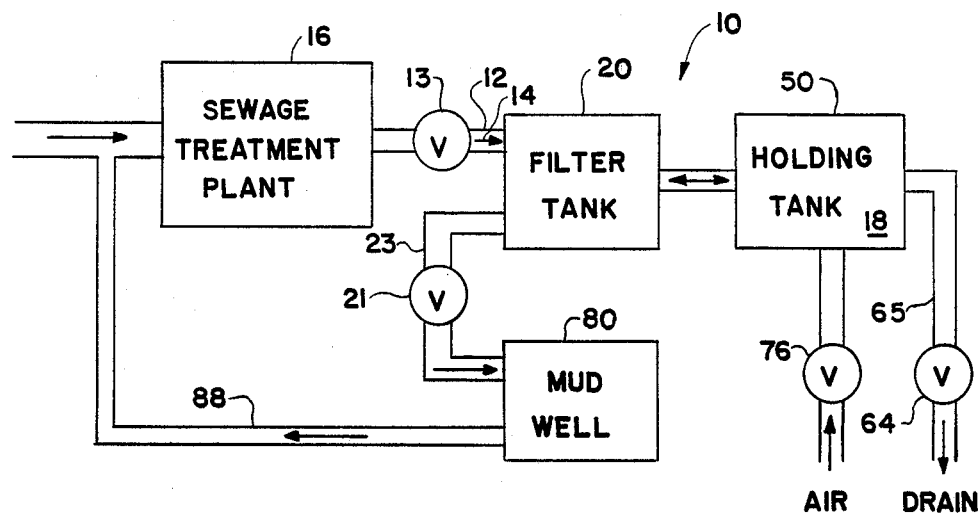
FIG. 5 is a schematic flow chart showing the fluid flow in the backwashing filter apparatus.

FIG. 5 illustrates a schematic fluid flow diagram of one embodiment using the backwashing filter apparatus 10 in a sewage treatment plant 16 operation. During the filtering process the liquid to be filtered 14 enters the filter tank 20 by way of conduit 12. Conduit 12 optionally includes a valve 13 to control the flow from the sewage treatment plant 16. Valves 21 and 76 are in a closed position and valve 64 is in a open position during the filtering operation. The liquid to be filtered 14 is filtered by filter cell 34 where filter clogging material such as slit, sediment and the like is separated by the filtering medium 46 from the liquid to be filtered 14 to produce a filtered liquid 18. The filtered liquid 18 flows into backwash holding tank 60 where the excess filtered liquid 62 drains through drain conduit 65 which is controlled by valve 64. During the backwash process valve 64 is closed and valves 21 and 76 are opened. Compressed air 78 enters the holding tank 60 forcing the filtered liquid 18 back into conduit 48, into filter cell 34 and into the filter tank 20. The backwashing liquid entering filter tank 20 then flows out conduit 23 controlled by valve 21 into mud well 80 where it is pumped 86 via conduit 88 to the sewage treatment plant 16 for further treatment.

Figure 6:
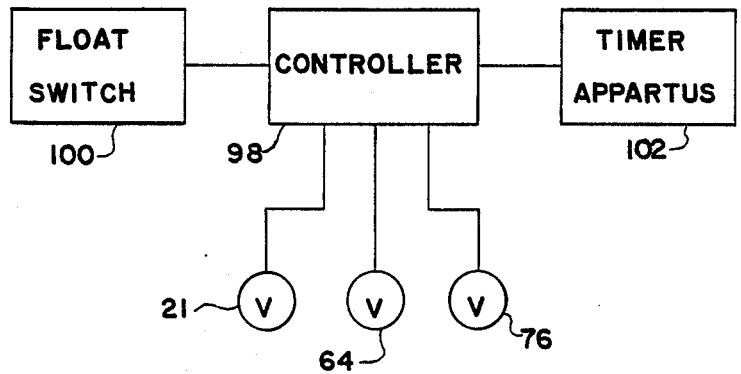
FIG. 6 is a block diagram showing the interconnections of the control unit and the valves controlled by the output of the control unit.

FIG. 6 illustates a block diagram showing the interconnections of the control unit 98 and the valves 21, 64 and 76 controlled by the output of the control unit. A timer apparatus 102 establishes the duration of the backwashing process when activated by the control means 100. Optional valve 13, not shown, may also be controlled by control unit 98.

The manner of operation of the apparatus of FIGS. 1-6 will now be described.

During a filtering operation a liquid to be filtered is introduced into the filter tank 20 by a conduit 12. The liquid to be filtered 14 reaches a first level 70 covering the filter cell 34. The liquid to be filtered 14 radially flows inwardly through the outer member 40, and into the filtering medium 46 which entraps the filter clogging material forming a filtered liquid 18 which passes through a plurality of slits 56 formed in the first portion 53 of the conduit 48 and into the passageway 49 of the conduit 48. The passageway 49 of the conduit 48 conducts the filtered liquid 18 into the backwash holding tank 60 such that the filtered liquid 18 collects in the backwash holding tank 60 until the first level 70 is reached. At the first level 70 the excess 62 filtered liquid 18 drains from the backwash holding tank 60 through a second outlet valve 64 and into a filtered liquid reservoir 74. The filtering operation terminates when the level of liquid to be filtered in the filter tank 20 reaches a second level 72 indicating that the filtering medium 46 is clogged. The clogged filtering medium impedes the flow of the liquid to be filtered 14 through the filter cell 34 causing the liquid to be filtered 14 to rise to a second level 72 from the first or operating level 70.

An unclogging operation or backwash operation is commenced when the second level 72 is reached by opening the first outlet valve 21 of the filter tank 20, closing the second outlet valve 64 of the backwash holding tank 60 and opening the inlet valve 76 to a compressed gas 78 source. The incoming compressed gas forces the filtered liquid 18 in the backwash holding tank 60, as a cleansing liquid 19, through conduit 48, through the plurality of slits 56 formed in the first portion 53 of conduit 48 and through the filtering medium 46 whereby the material clogging the filtering medium 46 is loosened and forced radially outward from the filter cell 34, through the plurality of openings 42 formed in the outer member 40 into the filter tank 20. The backwashing liquid 19 from the filter tank 20 discharges through the first outlet valve 21 thereby backwashing the filter cell 34 and the filter tank 20.

The preferred method of operation includes an automatic backwash control 98 utilizing a float switch control means 100 to initiate the backwash process. The float switch control means 100 is positioned in the filter tank 20. The float switch control means 100 is activated when the second level 72 is reached in the filter tank 20 thereby closing the second outlet valve 64 of the backwash holding tank 60, opening the first outlet valve 21 of the filter tank 20 and opening the inlet valve 76 of the backwash holding tank 60 to admit compressed gas into the backwash holding tank 60. A timing means 102 activated by the float switch control means 100 terminates the backwash process by closing the first outlet valve 21, and opening the second outlet valve 64 and closing the inlet valve 76 after a preset period of time to enable further preparation of filtered liquid 18.

In most applications of the apparatus of the invention the flow coming into the filter tank 20 will be treated sewage treatment plant 16 effluent. In this application a mud well 80 is positioned below the filter tank 20 in order to take advantage of the backwash flow seeking a lower level. Also, mud well 80 will include a pmp 86 to return the spent backwash 84 to the sewage treatment plant 16 for further treatment.

In order to more specifically described the above-described apparatus, a filter cell 34 is constructed using P.V.C. piping with a 2 inch outside diameter as the conduit 48. Formed in the surface of a first portion 53 of the P.V.C. pipe (conduit 48) are a plurality of 0.01 inch wide slits. A six inch diameter cylindrically shaped screen (outer member) 40 with 0.01 inch holes about its surface is spaced apart in a coaxial manner about four inches from the first portion 53 of the conduit 48. A plug is positioned at the opening at the first end 50 of the pipe 48 to prevent discharge of the filtered liquid through the opening and the ends 41,43 of outer member are sealed relative the filtering medium to maintain the filtering medium internal the outer member, thereby sealing 37,39 the first 36 and second 38 ends of the filter cell 34, respectively. The filtering medium is sand with an average diameter of 0.02 to 0.03 inches. The sand is positioned in the cylindrical volume between the P.V.C. pipe (first portion 53 of the conduit 48) and the screen (outer member 40). This volume is the volume between the diameter of the outer member (6 inches) and the diameter of the conduit (2 inches) when considered with the length of the filter cell. The length of the filter cell in the filter tank is about 72 inches. A mud well is positioned below the filter tank and in a manner which results in a downward slope of about 6 inches of the filter tank toward valve 21. The filter tank bottom is V-shaped with the first outlet valve 21 positioned at the apex 30 of the filter tank. The width of the filter tank is about 12 inches. The length of the filter tank is about 80 inches. A backwash holding tank 60 is supplied for each filter cell 34 in order that each filter cell may be cleaned individually. The opening at the second end of the P.V.C. pipe 48 is open to enable the filtered liquid to drain into the holding tank. The backwash holding tank holds about 4 cubic feet of filtered liquid. The second outlet valve 64 is positioned proximate the top of the backwash holding tank 60. The load on the filter cell is about 2 gallons per square foot per minute per cell. During the backwashing operation, compressed air is supplied at about 90 pounds per square inch to the first inlet valve 76 on the holding tank 60. The duration of the backwash process is about 1 minute.

It is to be understood that the apparatus of the invention may be built to any desired size and capacity desired and the above description is not limiting.

The filter cell of the invention enables the filtering capacity of the filtering medium to be maximized by its radial placement about the conduit. That is, as a portion of the filtering medium becomes clogged there are numerous points about the circular surface area of the filter cell with remaining capacity to filter. Preferably, the second end 54 of the conduit 48 is positioned near the bottom 75 of the backwash holding tank. This position maximizes the amount of filtered liquid to be used as a cleansing liquid in the backwash process.

The composition of the filter tank, mud well and/or backwash holding tank comprise concrete, fiberglass or the like.

The outer member 40 of the filter cell 34 comprises any material such as aluminum, steel or the like which is able to be fabricated to permit a plurality of openings to be formed therein or can be configured into a screen or mesh with the required plurality of openings for fluid passage through the outer member.

The conduit of the filter cell comprises a pipe or pipe-like structure. The most preferred plastic is P.V.C. (polyvinyl chloride), but other plastics such as ABS (acrylo-nitrile butadiene-styrene), CVPC (chlorinated polyvinyl chloride) may be used. Also, other pipeing such as steel, copper or brass may be used. While the shape of the cross-section of the pipe may vary, the pipe used must structurally sufficient to permit a plurality of slits or long narrow cuts to be formed therein.

The size of the openings in the inner and outer member is determined by the physical size of the filtering medium when the filtering medium is granular.

The purpose of the openings in the conduit is to keep the filtering medium external the conduit and to allow fluid communication between the filtered liquid passing through the filtering medium and the hollow inner portion of the conduit of the filter cell during the filtering process. During the backwash process, the purpose of the openings of the conduit is to allow fluid communication between the cleansing liquid in the hollow inner portion of the conduit and the filtering medium external the conduit while maintaining the filter medium external the conduit.

The purpose of the openings in the outer member is to keep the filtering medium internal the outer member and to allow fluid communication between the liquid to be filtered in the filter tank and the filtering medium of the filter cell during the filtering process. During the backwash process the purpose of the openings in the outer member is to allow fluid communication between the radially outwardly flowing cleansing liquid and the filter tank while maintaining the filterig medium internal the outer member. Therefore, the greater the physical size of the granular filtering medium, the greater the open area may be for individual slits and openings and still accomplish the above stated purposes.

The compressed gas used during the backwash process may be any compressible gas, such as air, nitrogen or the like.

The filter and backwash apparatus requires that the outer member include openings be of a sufficient size to permit the retention of the filtering medium internal the outer member while allowing fluid communication therethrough. The filter and backwash apparatus requires that the conduit include slits be of a sufficient size to permit the retention of the filtering medium external the conduit while allowing fluid communication therethrough.

The filtering medium may be composed of any material which is capable of being held within the filter cell by the conduit and outer member and which filters sediment and the like from the liquid to be filtered. The preferred filtering medium is granular. The most preferred granular filtering medium is sand. However, other granular filtering mediums such as glass macrospheres manufactured by 3M Company may be used in the apparatus of the invention.

The control valves (first and second outlet valves and inlet valve) are the "open-closed" type which may operate electrically or pneumatically. The control valves and the control float switch for activating control valves and the timing mechanism are conventional and known in the art.

The number of filtering and backwashing apparatus 10 used in the filtering process is the number sufficient to filter the quantity of influent delivered to the filter tank(s). Generally, the number sufficient is that which allows the backwashing of at least one filter while maintaining sufficient filtering capacity to filter the influent. In the alternative, the influent to the filter tank may be terminated while the backwashing process is taking place. If the rate of influent flow to the filter tank is low, it need not be terminated during the backwash process.

The physical shape of the inner and outer member is preferably cylindrical. Other shapes would be expected to be operable within the apparatus of the invention.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed:

1. A liquid filtering and backwashing apparatus comprising:
   a filter tank to receive in use a liquid to be filtered;
   a first outlet valve in fluid communication with said filter tank to enable in use an outward fluid flow from said filter tank;
   a filter cell to filter in use the liquid to be filtered;
   a conduit havig a first portion and a second portion;
   said filter cell including said first portion of said conduit and an outer member with said outer member positioned around and spaced from said first portion of said conduit;
   said first portion of said conduit and said outer member each being provided with a plurality of openings to enable fluid communication therethrough;
   said conduit having a first end and a second end;
   said outer member having a first end and a second end;
   said filter cell having a first end and a second end with said first end of said filter cell including said first end of said outer member and said first end of said conduit and with said second end of said filter cell including said second end of said outer member;

said first portion of said conduit and said outer member of said filter cell disposed within said filter tank;

a filtering medium positioned in use between said first portion of said conduit and said outer member to entrap filter clogging material from the liquid to be filtered thereby forming a filtered liquid;

said first and second ends of said filter cell being sealed in use such that said filtering medium is contained between said first portion of said conduit and said outer member;

a backwash holding tank to collect in use said filtered liquid;

said second portion of said conduit extending into said backwash holding tank to provide fluid communication between said backwash holding tank and said first portion of said conduit;

a second outlet valve in fluid communication with said backwash holding tank to enable in use said filtered liquid to drain from said holding tank;

an inlet valve in fluid communication with said backwash holding tank to admit n use a compressed gas into said holding tank after closing said second outlet valve in fluid communication with said holding tank, opening said first outlet valve in fluid communication with said filter tank to enable backwashing of said filter cell and filter tank.

2. The filter and backwash apparatus of claim 1 wherein said filter tank includes a V-shaped bottom to enhance outward fluid flow from said first outlet valve in fluid communication with said filter tank.

3. The filter and backwash apparatus of claim 2 wherein said filter cell is positioned parallel to said V-shaped bottom of said filter tank.

4. The filter and backwash apparatus of claim 2 wherein said V-shaped bottom further includes a first end and a second end;

said first end of said V-shaped bottom being lower relative said second end of said V-shaped bottom; and said first outlet valve in fluid communication with said filter tank such that in use said outward fluid flow flows from said filter tank proximate said first end of said V-shaped bottom.

5. The filter and backwash apparatus of claim 1 wherein said filtering medium in use is granular.

6. The filter and backwash apparatus of claim 5 wherein said granular filtering medium is sand.

7. The filter and backwash apparatus of claim 1 wherein said plurality of openings in said first portion of said conduit are slits.

8. The filter and backwash apparatus of claim 7 wherein said slits are about 0.010 inches in width, said openings in said outer member have a diameter of about 0.01 inches; and in use said filter medium is granular having a diameter of about 0.02 to 0.03 inches.

9. The filter and backwash apparatus of claim 8 wherein said granular filter medium is sand.

10. The filter and backwash apparatus of claim 1 wherein said filter cell is disposed in said filter tank whereby said first end of said filter cell is lower relative to said second end of said filter cell.

11. The filter and backwash apparatus of claim 1 wherein said outer member is screen.

12. The filter and backwash apparatus of claim 1 further including a float switch control means positioned in said filter tank; and said float switch being activated in use when a second level in said filter tank is reached thereby initiating a backwash process by opening said first outlet valve in fluid communication with said filter tank, and closing said second outlet valve in fluid communication with said holding tank, and opening said inlet valve to admit compressed gas into said holding tank.

13. The filter and backwash apparatus of claim 12 further including a timing means activated in use by said float switch control means to close said first outlet valve, to open said second outlet valve and to close said inlet valve after a preset period of time to terminate the backwashing process and initiate the filtering process.

14. The filter and backwash apparatus of claim 1 wherein said outer member is of a cylindrical shape.

15. The filter and backwash appartus of claim 1 wherein said first outlet valve is in fluid communication with a reservoir which is in fluid communication with a sewage treatment facility.

16. A liquid filtering and backwashing apparatus comprising:

a filter tank for receiving in use a liquid to be filtered;

a first outlet valve in fluid communication with said filter tank to enable in use an outward flow from said filter tank;

said filter tank includes a V-shaped bottom to enhance in use said outward flow from said first outlet valve in fluid communication with said filter tank;

said V-shaped bottom of said filter tank further includes a first end and a second end;

said first end of said V-shaped bottom of said filter tank being lower relative said second end of said V-shaped bottom of said filter tank;

said first outlet valve in fluid communication with said filter tank to enable said outward fluid flow from said first end of said V-shaped bottom, a filter cell for filtering in use the liquid to be filtered;

a conduit having a first portion and a second portion;

said filter cell including an outer member and said first portion of said conduit;

said conduit having a first end and a second end;

said first portion of said conduit of said filter cell and said outer member of said filter cell disposed within said filter tank;

said outer member of said filter cell being spaced apart relative to said first portion of said conduit;

a filtering medium positioned in use between said first portion of said conduit and said outer member to entrap filter clogging material from the liquid to be filtered thereby forming a filtered liquid;

said filter cell having a first end and a second end with said first and second ends of said filter cell being sealed to retain in use said filtering medium between said first portion of said conduit and said outer member;

said first portion of said conduit being provided with a plurality of openings to enable in use fluid communication into said conduit while retaining said filtering medium external said first portion of said conduit;

a plurality of openings formed in said outer member to enable fluid communication with said filtering medium;

a backwash holding tank to collect said filtered liquid;

said second portion of said conduit extending into said backwash holding tank to provide fluid communication between said backwash holding tank and said conduit;

a mud well positioned below said filter tank;

said first outlet valve being in further fluid communication with said mud well to enable in use said outward flow from said filter tank to be received by said mud well;

a second outlet valve in fluid communication with said backwash holding tank to enable in use said filtered liquid to drain from said backwash holding tank;

an inlet valve in fluid communication with said backwash holding tank to admit in use compressed gas into said backwash holding tank after closing said second outlet valve in fluid communication with said backwash holding tank, opening said first outlet valve in fluid communication with said filter tank thereby enabling a backwashing of said filter cell and filter tank.

17. A liquid filtering and backwashing apparatus comprising:

a filter tank for receiving in use a liquid to be filtered;

a filter cell having a first and second end disposed within said filter tank;

a conduit having a first portion and a second portion;

said filter cell including said first portion of said conduit and an outer member with said outer member being positioned around and spaced from said first portion of said conduit for receiving in use a filtering medium therebetween;

said first portion of said conduit and said outer member each being provided with a plurality of openings to enable fluid communication therethrough;

said second portion of said conduit being in fluid communication with a backwash holding tank;

a first outlet valve in fluid communication with said filter tank to enable an outward flow from said filter tank;

a second outlet valve in fluid communication with said backwash holding tank to enable in use outward flow therefrom;

said second outlet valve in fluid communication with said backwash holding tank being positioned to establish in use a first level wherein said first level enables said filter cell disposed in said filter tank to be covered by the liquid to be filtered; and an inlet valve in fluid communication with said backwash holding tank to admit in use compressed gas into said holding tank to enable backwashing of said filter cell and filter tank.

18. A filtering and backwashing process comprising:

providing a liquid filtering and backwashing apparatus including a filter tank in fluid communication with a first outlet valve, a conduit having a first and a second portion, a filter cell which includes the first portion of the conduit and an outer member with the outer member spaced apart from the first portion of the conduit and with a filtering medium positioned between the first portion of the conduit and the outer member where the first portion of the conduit and the outer member are provided with a plurality of openings to permit fluid communication therethrough, with the first portion of the conduit of the filter cell and the outer member of the filter cell being disposed within the filter tank and the second portion of the conduit in fluid communication with a backwash holding tank which is in fluid communication with a second outlet valve and an inlet valve; and conducting a filter and backwash operation comprising:

introducing a liquid to be filtered into the filter tank to reach a level to enable the liquid to cover the filter cell thereby enabling the liquid to flow inward through the plurality of openings of the outer member and into the filtering medium which entraps the filter clogging material thereby forming a filtered liquid which passes through the plurality of openings formed in the first portion of the conduit;

permitting the filtered liquid to be conveyed by the second portion of the conduit into the backwash holding tank whereby the filtered liquid is collected;

draining excess filtered fluid from the backwash holding tank through the second outlet valve;

periodically terminating the filtering operation when the liquid to be filtered in the filter tank reaches a second level in the filter tank indicating the filtering medium is clogged thereby impeding the flow of the liquid to be filtered through the filter cell resulting in the liquid to rise and conducting a backwash operation comprising:

opening the first outlet valve in fluid communication with the filter tank;

closing the second outlet valve in fluid communication with the backwash holding tank;

opening the inlet valve in fluid communication with a compressed gas source to force the filtered liquid collected in the backwash holding tank as a cleansing liquid into the conduit, through the plurality of openings of the conduit, through the filtering medium and through the plurality of openings of the outer member whereby the material clogging the filtering medium is loosened and forced outward from the filter cell and into the filter tank; and discharging the cleansing liquid and clogging material from the filter tank through the first outlet valve thereby backwashing the filter cell and the filter tank.

19. The method of claim 18 wherein the apparatus includes a float switch control means positioned in the filter tank to close the second outlet valve in fluid communication with the holding tank, to open the first outlet valve be in fluid communication with the filter tank and to open the inlet valve in fluid communication with the holding tank to admit compressed gas into the holding tank when the second level is reached in the filter tank; and a timing means activated by the float switch control means to close the first outlet valve, to open the second outlet valve and the inlet valve after a preset period of time to enable further preparation of filtered liquid.

20. The method of claim 18 wherein the apparatus includes a mud well to receive the cleansing liquid and clogging material discharged from the filter tank

* * * * *

UNITED STATES PATENT AND TRADEMARK OFFICE
CERTIFICATE OF CORRECTION

PATENT NO. : 4,818,420

DATED : April 4, 1989

INVENTOR(S) : Ken Mims

It is certified that error appears in the above-identified patent and that said Letters Patent is hereby corrected as shown below:

Column 1, line 33, delete "with the" and insert therefor --within the--.
Column 2, line 68, delete "filer" and insert therefor --filter--.
Column 6, line 39, delete "thd" and insert --the--.
Column 10, line 16, delete "wall" (second occurence).
Column 11, line 46, after "holding" insert --tank--.

Signed and Sealed this

Twentieth Day of February, 1990

Attest:

JEFFREY M. SAMUELS

Attesting Officer     Acting Commissioner of Patents and Trademarks